I. C. BATTLES.
FAUCET.
APPLICATION FILED JAN. 22, 1919.

1,320,967.

Patented Nov. 4, 1919.

Inventor
Ira C. Battles
By Victor J. Evans
Attorney

UNITED STATES PATENT OFFICE.

IRA C. BATTLES, OF PHOENIX, ARIZONA.

FAUCET.

1,320,967.  Specification of Letters Patent.  Patented Nov. 4, 1919.

Application filed January 22, 1919.  Serial No. 272,538.

*To all whom it may concern:*

Be it known that I, IRA C. BATTLES, a citizen of the United States, residing at Phoenix, in the county of Maricopa and State of Arizona, have invented new and useful Improvements in Faucets, of which the following is a specification.

This invention relates to improvements in faucets, especially faucets such as are screwed in the heads of barrels and the like, the object of the invention being to provide a faucet of this kind with means operated by the handle to enable the turning plug of the faucet to be locked when in closed position so that the faucet cannot be used, to draw material from the barrel and to also prevent the faucet from being unscrewed and removed from the barrel head while the turning plug is thus locked, the invention consisting in a faucet having a turning plug and also having a fixed loop to receive a lock shackle or the like, in combination with a handle pivotally connected to the turning plug and provided at the inner end with a portion having a slot to receive the loop and a lug to engage the chine of the barrel and prevent the faucet from being unscrewed from the head of the barrel.

The invention consists in the construction, combination and arrangement of devices hereinafter described and claimed.

In the accompanying drawings:—

Figure 1:
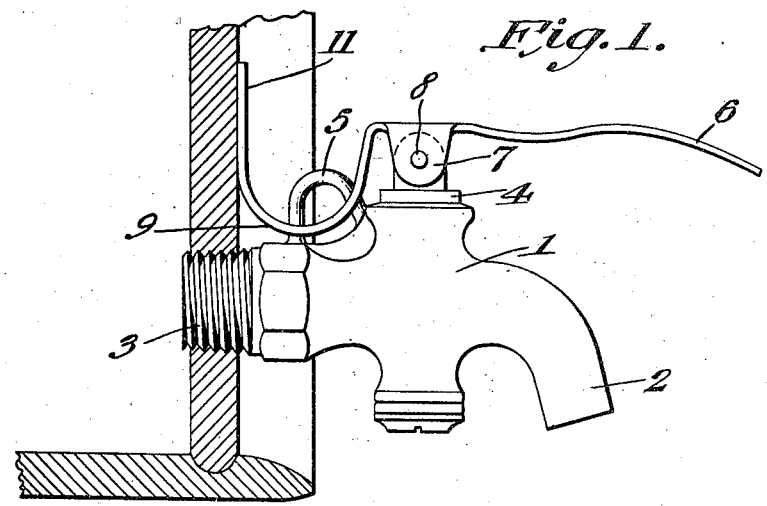
Figure 1 is an elevation, partly in section, of a faucet provided with locking devices constructed and arranged in accordance with my invention, and showing the faucet applied to the head of a barrel.
Figure 2:
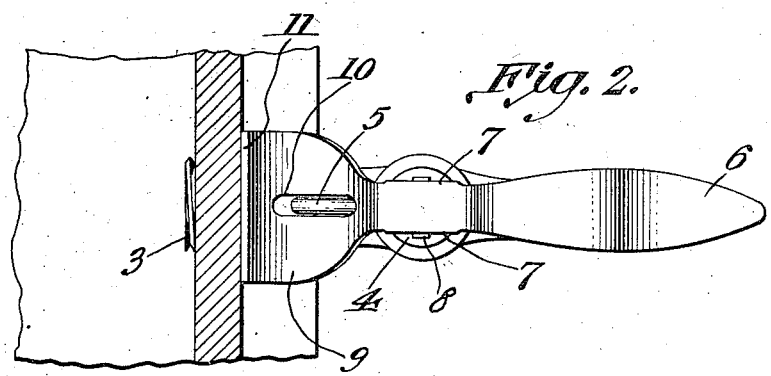
Fig. 2 is a plan of the same.
Figure 3:
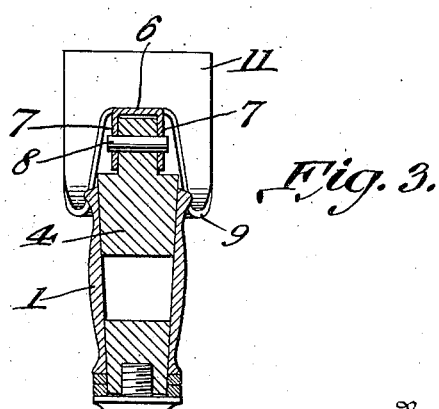
Fig. 3 is a detail transverse sectional view of the same.

The faucet 1 which is here shown, is of the usual form, provided with the usual curved spout, 2, the screw threaded inner end 3, to enable the faucet to be screwed in an opening in the head of a barrel, and the usual turning plug 4.

In accordance with my invention, I provide the body of the faucet with a loop 5 in the angle between the inner end of the faucet and that portion of the body of the faucet through which the turning plug extends. This loop is adapted to receive the shackle of a padlock, or other suitable locking member or element.

The handle 6 is provided with lugs 7 which are arranged astride the upper end of the turning plug and pivoted thereto as at 8. The handle is also provided at its inner end with a U-shaped extension 9 which has a slot 10, for the reception of the loop 5 and also has an upwardly extending broadened lug 11 which when the faucet is in place is opposite the head of the barrel.

When the turning plug is in closed position, to cut off the flow of liquid through the faucet, the U-shaped portion 9 of the handle may be engaged with the loop 5, and a padlock or other locking implement or element employed to lock the handle in place and thus effectually prevent the plug of the faucet from being turned and to hence prevent the faucet from being used to draw liquid from the barrel. While the faucet is thus locked it is also prevented from being removed from the barrel, as any effort to turn the body of the faucet to unscrew the same from the barrel head, will cause the lug 11 to engage and come in contact with the chine of the barrel and thus prevent further unscrewing of the faucet and its removal from the barrel head.

While I have herein shown and described the preferred form of my invention, I would have it understood that changes may be made in the form, proportion and construction of the several parts, without departing from the spirit of my invention and within the scope of the appended claim.

Having thus described my invention I claim:—

A faucet having in combination a screw threaded portion, a fixed loop to receive a lock and a handle pivotally connected with the valve of the faucet, said handle terminating to provide a U-shaped portion having a slot in the bight thereof to receive said loop, one leg of said U-shaped portion being positioned adjacent said screw threaded member.

In testimony whereof I affix my signature.

IRA C. BATTLES.